United States Patent
Iwai et al.

(10) Patent No.: US 8,570,558 B2
(45) Date of Patent: Oct. 29, 2013

(54) IMAGE PROCESSING APPARATUS, METHOD, AND RECORDING MEDIUM CAPABLE OF OUTPUTTING VOICE DATA

(75) Inventors: Toshimichi Iwai, Katsuragi-gun (JP); Takeshi Morikawa, Takarazuka (JP); Kaitaku Ozawa, Itami (JP); Kei Shigehisa, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1129 days.

(21) Appl. No.: 12/417,237

(22) Filed: Apr. 2, 2009

(65) Prior Publication Data
US 2009/0310173 A1 Dec. 17, 2009

(30) Foreign Application Priority Data

Jun. 11, 2008 (JP) ................................. 2008-153608

(51) Int. Cl.
G06F 3/12 (2006.01)
(52) U.S. Cl.
USPC .............. 358/1.15; 358/1.16; 704/7; 704/10; 704/270; 704/275
(58) Field of Classification Search
USPC ......... 358/1.14, 1.16, 305, 1.15; 399/81, 411; 704/7, 201, 274, 275, 277, 4, 246; 379/1.02, 67.1, 88.22
See application file for complete search history.

(56) References Cited

U.S. PATENT DOCUMENTS

| 7,110,692 | B2 | 9/2006 | Kotani |
| 7,222,076 | B2 | 5/2007 | Kobayashi et al. |
| 2003/0154079 | A1* | 8/2003 | Ota et al. ...................... 704/246 |
| 2005/0185217 | A1* | 8/2005 | Nishizawa et al. .......... 358/1.15 |
| 2006/0116884 | A1* | 6/2006 | Itaki et al. ..................... 704/271 |
| 2007/0064883 | A1* | 3/2007 | Rosenthal et al. ........... 379/67.1 |
| 2008/0091407 | A1 | 4/2008 | Furihata et al. |

FOREIGN PATENT DOCUMENTS

| JP | 2002-278575 | 9/2002 |
| JP | 2005-96246 | 4/2005 |
| JP | 2005-117205 | 4/2005 |
| JP | 2006-262267 | 9/2006 |
| JP | 2008-83459 | 4/2008 |

OTHER PUBLICATIONS

English Machine Translation of JP 2006-262267-A (Murata, Published Sep. 28, 2006).*
Japanese Notification of Reasons for Refusal mailed May 11, 2010, directed to counterpart Japanese Application No. 2008-153608; 5 pages.

* cited by examiner

*Primary Examiner* — Benny Q Tieu
*Assistant Examiner* — Juan M Guillermety
(74) *Attorney, Agent, or Firm* — Morrison & Foerster LLP

(57) ABSTRACT

An image processing apparatus includes: a data memory that stores in itself voice guide data pieces; a voice output portion that outputs the voice guide data pieces stored in the data memory; and a controller. The controller prohibits a first voice guide data piece from being outputted according to a job by the voice output portion, while a second voice guide data piece is being outputted according to another job thereby.

6 Claims, 10 Drawing Sheets

| Situation of Voice Guide | Priority Level | Phrase 1 | Phrase 2 | Phrase 3 |
|---|---|---|---|---|
| staple (top-left) | medium | the sheets are top-left | stapled | — |
| staple (two-point-left) | medium | the sheets are two-point-left | stapled | — |
| document setting | medium | please open the document cover | put a document back-left on the glass surface | and press the start button |
| · | · | · | · | · |
| · | · | · | · | · |
| print jam | high | some sheets are stuck | please open the cover in the right edge of the apparatus and remove the stuck sheets | — |
| print completion | low | the print operation is completed | — | — |
| · | · | · | · | · |

FIG.2

| Voice Guide (Phrase) | Voice Data File |
|---|---|
| the sheets are top-left | left1.mp3 |
| the sheets are two-point-left | left2.mp3 |
| stapled | staple.mp3 |
| please open the document cover | orgset1.mp3 |
| put a document back-left on the glass surface | orgset2.mp3 |
| and press the start button | orgset3.mp3 |
| · | · |
| · | · |
| some sheets are stuck | jam.mp3 |
| please open the cover in the right edge of the apparatus and remove the stuck sheets | remove.mp3 |
| the print operation is completed | printed.mp3 |
| · | · |

FIG.3

| Voice Data File | Priority Level |
|---|---|
| orgset1.mp3 (please open the document cover) | medium |
| orgset2.mp3 (put a document back-left on the glass surface) | medium |
| orgset3.mp3 (and press the start button) | medium |

| Voice Data File | Priority Level |
|---|---|
| orgset2.mp3 (put a document back-left on the glass surface) | medium |
| orgset3.mp3 (and press the start button) | medium |
| printed.mp3 (the print operation is completed) | low |

FIG.11

| Voice Data File | Priority Level |
|---|---|
| orgset2.mp3 (put a document back-left on the glass surface) | medium |
| jam.mp3 (some sheets are stuck) | high |
| remove.mp3 (please open the cover in the right edge of the apparatus and remove the stuck sheets ) | high |
| orgset3.mp3 (and press the start button) | medium |

FIG.12

| Voice Data File | Priority Level |
|---|---|
| orgset2.mp3 (put a document back-left on the glass surface) | medium |
| jam.mp3 (some sheets are stuck) | high |
| remove.mp3 (please open the cover in the right edge of the apparatus and remove the stuck sheets ) | high |
| orgset2.mp3 (put a document back-left on the glass surface) | medium |
| orgset3.mp3 (and press the start button) | medium |

FIG.13

IMAGE PROCESSING APPARATUS, METHOD, AND RECORDING MEDIUM CAPABLE OF OUTPUTTING VOICE DATA

This application claims priority under 35 U.S.C. §119 to Japanese Patent Application No. 2008-153608 filed on Jun. 11, 2008, the entire disclosure of which is incorporated herein by reference in its entirety.

BACKGROUND OF THE INVENTION

1. Field of the Invention

The present invention relates to an image processing apparatus such as an image forming apparatus having the voice guide function, a voice guide method of the image processing apparatus, and a computer readable recording medium having a voice guide program recorded therein to make a computer execute processing.

2. Description of the Related Art

The following description sets forth the inventor's knowledge of related art and problems therein and should not be construed as an admission of knowledge in the prior art.

Some image processing apparatuses that output voice guides of operating instructions, statuses of the apparatuses and other information, are proposed as MFPs (Multi Function Peripherals) that are multifunctional digital machines having the copy function, the print function, the FAX function and etc.

As an example of such image processing apparatuses having the voice guide function, there is an image processing apparatus that immediately stops outputting a voice guide of an operating instruction and gives a notice of the occurrence of a paper jam, if a print job inputted from an external apparatus causes the paper jam while a user is performing an operation via the operation panel according to the voice guide, which is proposed by Japanese Unexamined Laid-open Patent Publication No. 2005-117205.

Furthermore, there is an image processing apparatus that is capable of partially changing voice guide speeches by using a plurality of voice databases which orders are determined by a replay order database, which is proposed by Japanese Unexamined Laid-open Patent Publication No. 2006-262267.

However, if the image processing apparatus described in Japanese Unexamined Laid-open Patent Publication No. 2005-117205 suddenly stops outputting a voice guide, listener users in front of the apparatus may not understand very well what is instructed by the voice guide, which causes a confusion and still leaves inconveniences.

Furthermore, the image processing apparatus described in Japanese Unexamined Laid-open Patent Publication No. 2006-262267 is not capable of providing a complete solution to eliminate the above-mentioned inconveniences that may arise if it suddenly stops outputting the voice guide.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that is capable of preventing the inconveniences that if a voice guide happens to need to be outputted according to a job while a voice guide is being outputted according to another job, the currently-outputted voice guide is suddenly stopped and listener users in front of the apparatus are confused thereby.

It is another objective of the present invention to provide a voice guide method that is capable of preventing the inconveniences that if a voice guide happens to need to be outputted according to a job while a voice guide is being outputted according to another job, the currently-outputted voice guide is suddenly stopped and listener users in front of the apparatus are confused thereby.

It is yet another objective of the present invention to provide a computer readable recording medium having a voice guide program recorded therein to make a computer of the image processing apparatus execute processing by the voice guide method.

According to a first aspect of the present invention, an image processing apparatus includes:
 a data memory that stores in itself voice guide data pieces;
 a voice output portion that outputs the voice guide data pieces stored in the data memory; and
 a controller that prohibits a first voice guide data piece from being outputted according to a job by the voice output portion, while a second voice guide data piece is being outputted according to another job thereby.

According to a second aspect of the present invention, a voice guide method includes:
 outputting voice guide data pieces stored in a data memory according to jobs; and
 prohibiting a first voice guide data piece from being outputted according to a job, while outputting a second voice guide data piece according to another job.

According to a third aspect of the present invention, a computer readable recording medium has a voice guide program recorded therein to make a computer of the image processing apparatus execute:
 outputting voice guide data pieces stored in a data memory according to jobs; and
 prohibiting a first voice guide data piece from being outputted according to a job, while outputting a second voice guide data piece according to another job.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 2 is a table showing examples of voice guide data pieces stored in a voice guide data memory;

FIG. 3 is a table showing matched combinations of phrases of the voice guide data pieces shown in FIG. 2 and data files stored in the voice guide data memory;

FIG. 11 is a view showing an example of the voice output table when a voice guide data piece that matches a situation of a lower priority level is added therein;

FIG. 12 is a view showing an example of the voice output table when a voice guide data piece that matches a situation of a higher priority level is inserted therein;

FIG. 13 is a view showing an example of the voice output table that is used in another embodiment of the present invention.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
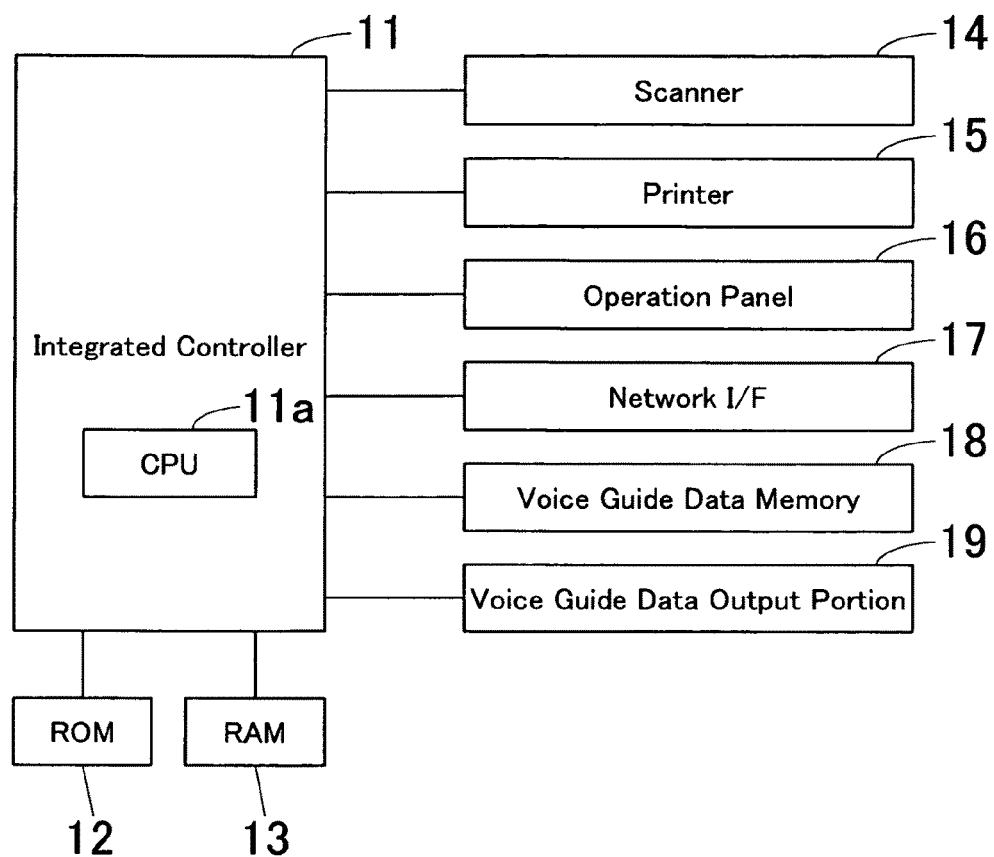
FIG. 1 is a block diagram schematically showing a configuration of an image processing apparatus according to one embodiment of the present invention.

FIG. 1 is a block diagram schematically showing a configuration of an image processing apparatus according to one embodiment of the present invention.

As shown in FIG. 1, an image processing apparatus 1 is a MFP as described above, and comprises an integrated controller 11, a ROM 12, a RAM 13, a scanner 14, a printer 15, an operation panel 16, a network interface (network I/F) 17, a voice guide data memory 18, a voice guide data output portion 19, and etc.

The integrated controller 11 comprises a CPU 11a, and centrally controls the entire image processing apparatus 1. In this embodiment, as well as implementation of the copy function, the print function, the FAX function and etc. as generally expected, the integrated controller 11 controls operations relating to voice guides, for example, a voice guide data piece suitable for a job is selected among those stored in the voice guide data memory 18, then set in a voice output table; a voice guide data piece is set in the voice output table depending on its priority level; and the voice guide data piece set therein is outputted by the voice guide data output portion 19. These operations will be detailed later.

The ROM 12 is a memory that stores in itself an operation program to be executed by the CPU 11a of the integrated controller 11, and other data.

The RAM 13 is a memory that provides an operation area in which the CPU 11a executes processing according to an operation program.

The scanner 14 reads images on a document placed on a document table (not shown in Figure), converts it into image data that is electronic data, and then outputs the image data.

The printer 15 prints out image data read out from a document by the scanner 14, print data received from a user terminal and other data, by a specified mode.

The operation panel 16 is used to perform various entry operations, and comprises various entry keys such as numeric keys and a start key, and a display such as a liquid crystal display.

The network interface 17 controls communications with image forming apparatus on the network and external apparatuses such as user terminals and a FAX terminal.

The voice guide data memory 18 stores in itself voice guide data pieces to be outputted as voice guides of operating instructions for executing various jobs, a status of the apparatus and other information. The voice guide data memory 18 is a memory device such as a hard disk apparatus.

The voice guide data output portion 19 outputs voice guides by replaying voice guide data pieces. The voice guide data output portion 19 is an embedded speaker, for example.

FIG. 2 is a table showing examples of voice guide data pieces stored in the voice guide data memory 18.

In this embodiment, the voice guide data pieces stored therein to be outputted in their matched situations are assigned to a plurality of phrases, as shown in FIG. 2. And a priority level is given to the respective situations.

For example, "staple (top-left)" is a voice guide to be outputted in the situation where a user has just configured the setting for a process to staple sheets top-left (hereinafter, will be referred to as "top-left stapling process"), and the priority level "medium" is given thereto. And the voice guide data pieces are assigned to two phrases: "the sheets will be top-left" as Phrase 1 and "stapled" as Phrase 2.

As for "staple (two-point-left)", it is a voice guide to be outputted in the situation where a user has just configured the setting for a process to staple sheets at two points lying in the left margin (hereinafter, will be referred to as "two-point-left stapling process), and the priority level "medium" is given thereto. And the voice guide data pieces are assigned to two phrases: "the sheets will be two-point-left" as the Phrase 1 and "stapled" as Phrase 2.

As for "document setting" it is a voice guide to be outputted in the situation where a user is requested to set a document, and the priority level "medium" is given thereto. And the voice guide data pieces are assigned to three phrases: "please open the document cover" as Phrase 1, "put a document back-left on the glass surface" as Phrase 2 and "and press the start button" as Phrase 3.

As for "print jam", it is a voice guide to be outputted in the situation where a print jam occurs during a print operation, and the priority level "high" is given thereto. And the voice guide data pieces are assigned to two phrases: "some sheets are stuck" as Phrase 1 and "please open the cover in the right edge of the apparatus and remove the stuck sheets" as Phrase 2.

As for "print completion", it is a voice guide to be outputted in the situation where a print operation has just been completed, and the priority level "low" is given thereto. And the voice guide data piece "the print operation is completed" is stored as Phrase 1.

FIG. 3 is a table showing matched combinations of phrases of the voice guide data pieces shown in FIG. 2 and data files stored in the voice guide data memory 18.

For example, the three phrases of the voice guide data piece to be outputted in the situation where a user is requested to set a document, are stored therein under the file names "orgset1.mp3", "orgset2.mp3" and "orgset3.mp3", respectively.

Figure 4:
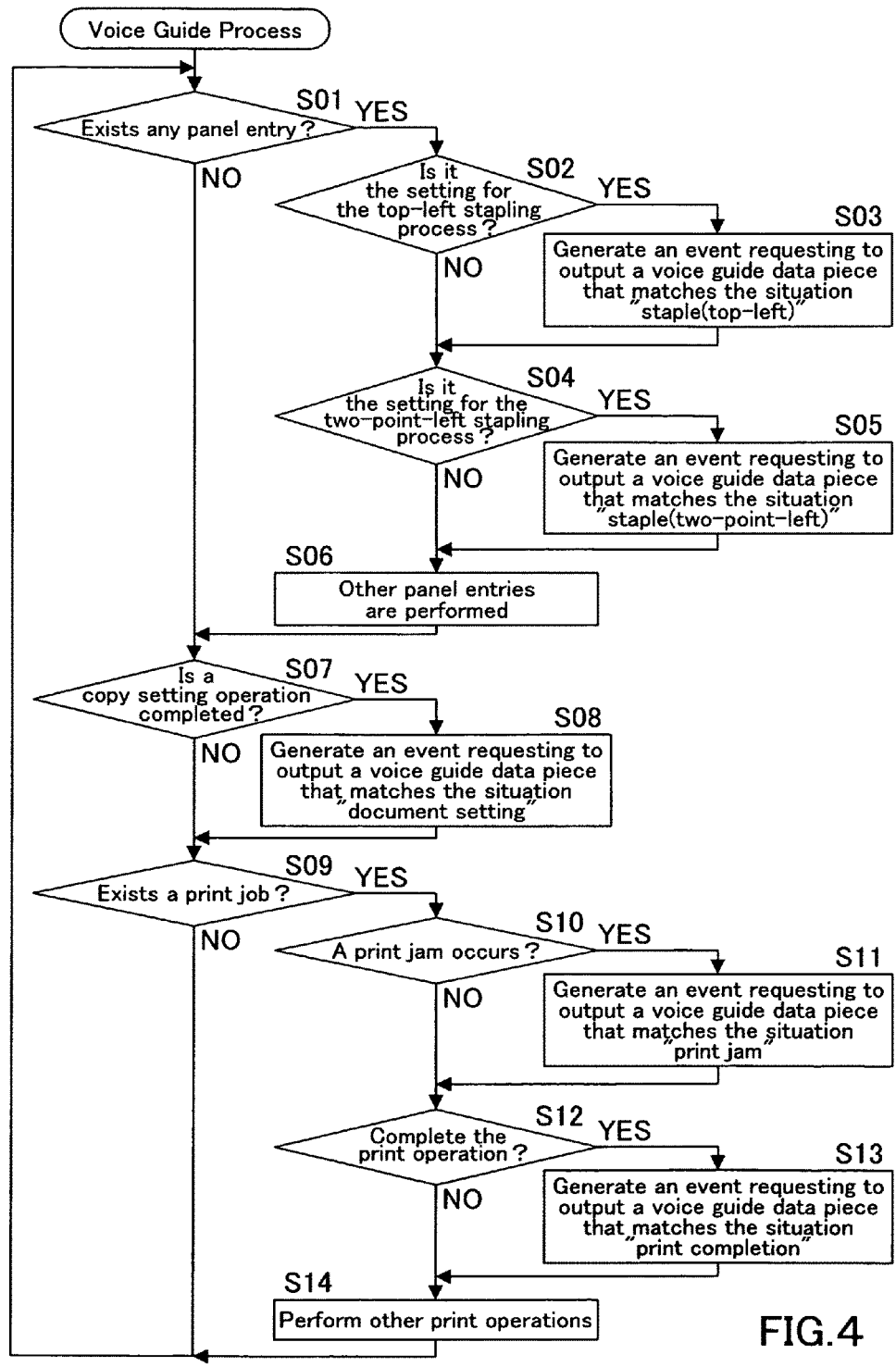
FIG. 4 is a flowchart representing a voice guide process performed in the image forming apparatus shown in FIG. 1.

FIG. 4 is a flowchart representing a voice guide process performed in the image processing apparatus 1 of FIG. 1. This procedure is executed by the CPU 11a of the integrated controller 11 of the image processing apparatus 1, according to a program stored in a recording medium such as the ROM 12.

In Step S01, it is judged whether or not there is any entry from the operation panel 16. If there is no panel entry (NO in Step S01), the routine proceeds to Step S07. If there is a panel entry (YES in Step S01), then it is judged in Step S02 whether or not the panel entry corresponds to the setting for the top-left stapling process.

If it does not correspond to the setting for the top-left stapling process (NO in Step S02), the routine proceeds to Step S04. If it corresponds to the setting for the top-left stapling process (YES in Step S02), an event requesting to output a voice guide data piece that matches the situation "staple (top-left)" (see FIG. 2) is generated in Step S03. After that, the routine proceeds to Step S04.

In Step S04, it is judged whether or not the panel entry corresponds to the setting for the two-point-left stapling process. If it does not correspond to the setting for the two-point-left stapling process (NO in Step S04), the routine proceeds to Step S06. If it corresponds to the setting for the two-point-left stapling process (YES in Step S04), an event requesting to output a voice guide data piece that matches the situation "staple (two-point)" is generated in Step S05. After that, the routine proceeds to Step S06.

In Step S06, other panel entries are performed. Then, the routine proceeds to Step S07.

In Step S07, it is judged whether or not a copy setting operation is completed. If it is not completed (NO in Step S07), the routine proceeds to Step S09. For example, if the screen is switched to a basic menu screen for copy setting, or if there has been no panel entries for a predetermined period of time since a copy condition such as a stapling process is lastly entered via the basic menu screen for copy setting, it is judged that a copy setting operation is completed, in Step S07 (YES in Step S07). And an event requesting to output a voice guide data piece that matches the situation "document setting" (see FIG. 2) is generated in Step S08. After that, the routine proceeds to Step S09.

In Step S09, it is judged whether or not there exists a print job. If there does not exist any print job (NO in Step S09), the routine goes back to Step S01. If there exists a print job (YES in Step S09), then it is judged in Step S10 whether or not a print jam occurs.

If no print jam occurs (NO in Step S10), the routine proceeds to Step S12. If a print jam occurs (YES in Step S10), an event requesting to output a voice guide data piece that matches the situation "print jam" (see FIG. 2) is generated in Step S11. After that, the routine proceeds to Step S12.

In Step S12, it is judged whether or not the print operation is completed. If the print operation is not completed (NO in Step S12), the routine proceeds to Step S14. If the print operation is completed (YES in Step S12), an event requesting to output a voice guide data piece that matches the situation "print completion" (see FIG. 2) is generated in Step S13. After that, the routine proceeds to Step S14.

In Step S14, other print processes are performed. Then the routine goes back to Step S01 and repeats these Steps from Step S01.

When an event requesting to output a voice guide data piece is generated in Steps S03, S05, S08, S11 or S13, a process to set the voice guide data piece in the voice output table. This process to set the voice guide data piece in the voice output table will be detailed later.

Figure 5:
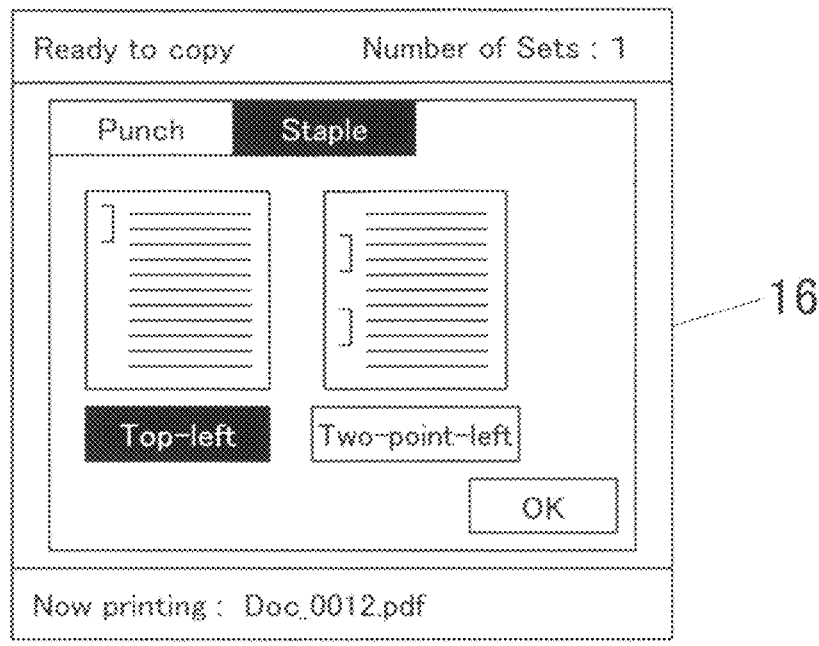
FIG. 5 is a view showing a copy mode setting screen displayed on an operation panel, via which a top-left stapling process has been selected.
Figure 6:
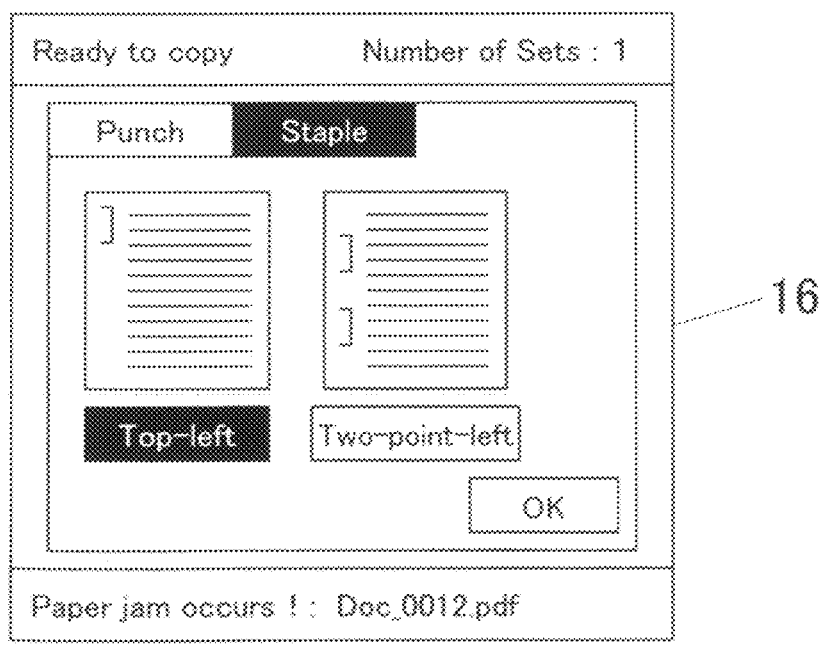
FIG. 6 is a view showing the screen that comes next to the screen shown in FIG. 5, if a print jam happens to occur.
Figure 7:
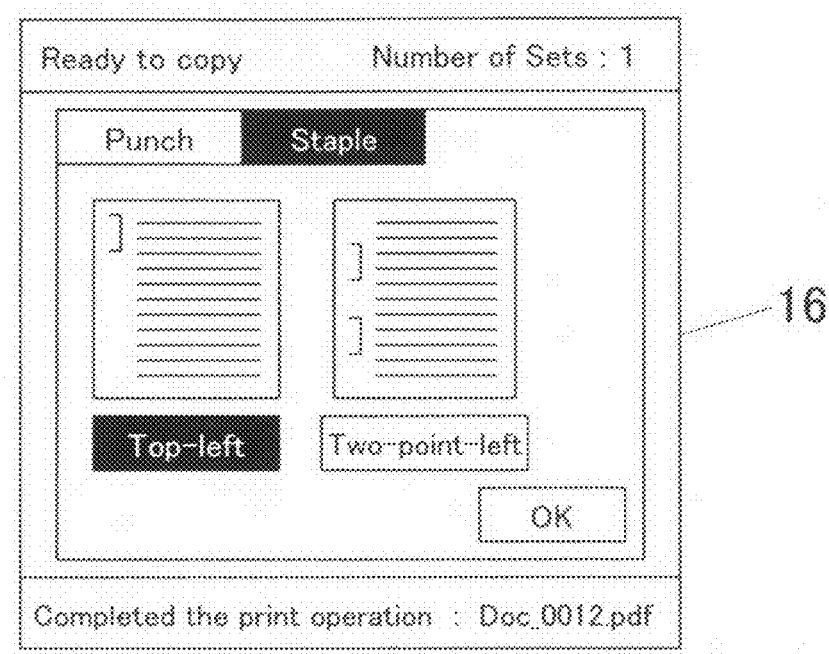
FIG. 7 is a view showing the screen that comes next to the screen shown in FIG. 5, when a print operation is completed.

The procedure above will be further explained with reference to FIG. 5 through FIG. 7. FIG. 5 shows a copy mode setting screen displayed on the operation panel 16, via which the top-left stapling process has been selected. In FIG. 5, the blacked-out buttons indicates that the buttons have been selected.

When a print job is executed under the condition where the top-left stapling process has been selected, a message indicating that a print job is now being executed about the file "Doc-0012.pdf", is displayed as shown in FIG. 5.

When such a screen is displayed as shown in FIG. 5, the voice guide is outputted as "the sheets are top-left" "stapled". And subsequently, the voice guide is outputted as "please open the document cover" "put a document back-left on the glass surface" "and press the start button".

If a print jam happens to occur while the voice guide is being outputted as mentioned above, since the situation where a print jam occurs during a print operation is highly prioritized, the voice guide is outputted as "some sheets are stuck" "please open the cover in the right edge of the apparatus and remove the stuck sheets" at an interval between phrases of the currently-outputted voice guide data piece. Also, a message indicating that some sheets are stuck is displayed on the operation panel 16, as shown in FIG. 6.

If the print operation is completed, since the situation where a print operation has just been completed is low prioritized, the voice data is outputted as "the print operation is completed" after the voice guide data piece that matches the situation "document setting" is outputted until the end thereof, for copy mode setting. At the same time, a message indicating that the print operation is completed is displayed on the operation panel 16, as shown in FIG. 7.

Figure 8:
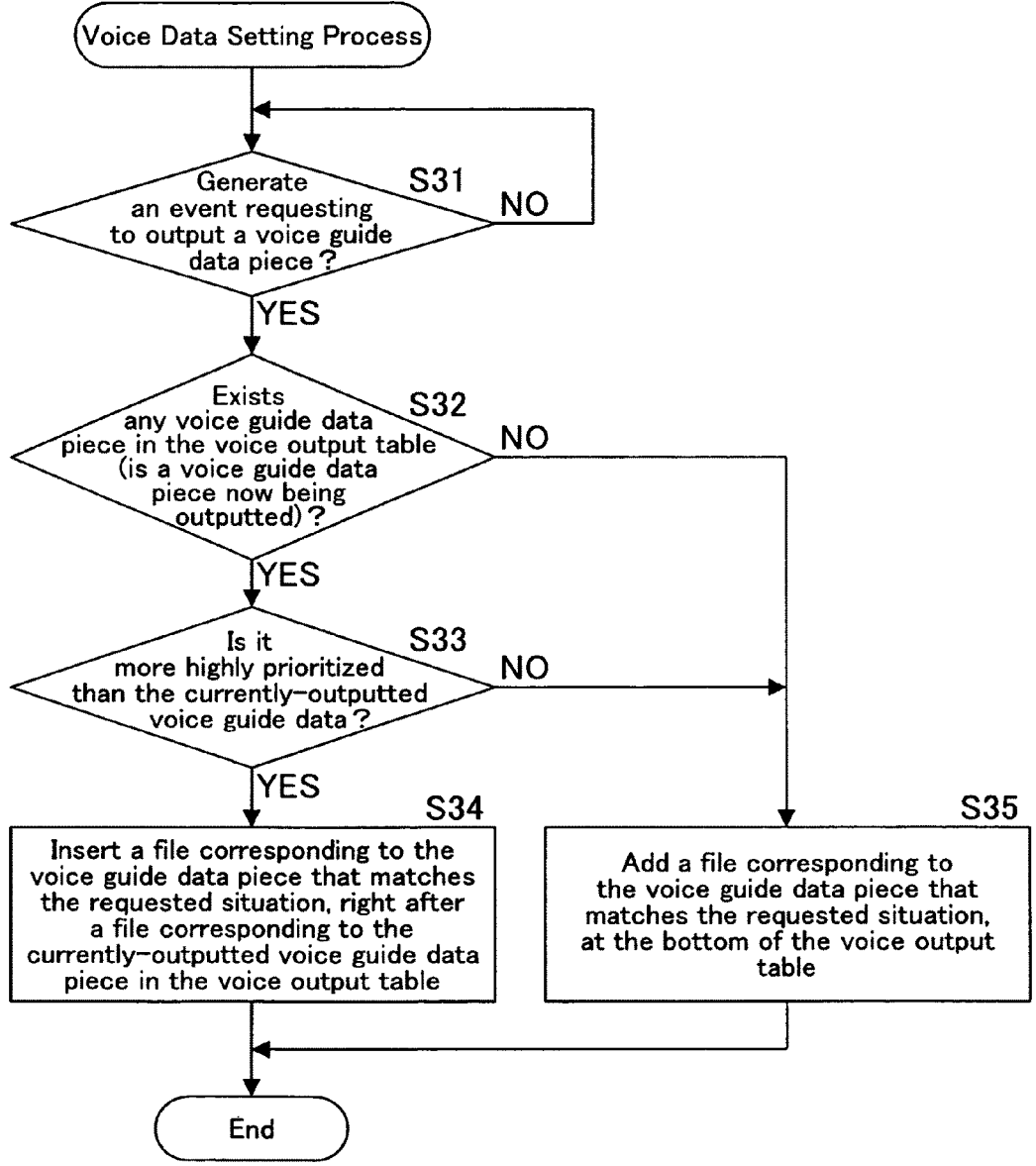
FIG. 8 is a flowchart representing a voice data setting process to set a voice guide data piece in a voice output table.

FIG. 8 is a flowchart representing a procedure executed when an event requesting to output a voice guide piece is generated in Steps S03, S05, S08, S11 or S13, which is a voice data setting process to set the voice guide data piece in the voice output table.

In the voice data setting process, as shown in FIG. 8, it is judged in Step S31 whether or not an event requesting to output a voice guide data piece is generated. If it is not generated (NO in Step S31), the routine waits until it is generated. If it is generated (YES in Step S31), then it is judged in Step S32 whether or not there exists any voice guide data piece in the voice output table, in other words, whether or not a voice guide data piece is now being outputted. If there does not exist any voice guide data piece in the voice output table (NO in Step S32), the routine proceeds to Step S35, in which a file corresponding to the voice guide data piece that matches the requested situation is set in the voice output table.

If there exists a voice guide data piece in the voice output table, in other words, if a voice guide data piece is now being outputted (YES in Step S32), the routine proceeds to Step S33, in which it is judged whether or not the voice guide data piece that matches the requested situation is prioritized more highly than the currently-outputted voice guide data piece.

If it is not prioritized more highly than the currently-outputted voice guide data piece (NO in Step S33), the routine proceeds to Step S35, in which a file corresponding to the voice guide data piece that matches the requested situation is added at the bottom of the voice output table. If it is prioritized more highly than the currently-outputted voice guide data piece (YES in Step S33), a file corresponding to the voice guide data piece that matches the requested situation is inserted right after a file corresponding to the currently-outputted voice guide data piece in the voice output table, in Step S34.

If there exists in the voice output table a file corresponding to a voice guide data piece, under the control of the CPU 11a of the image processing apparatus 1, the file is replayed by the voice guide data output portion 19, and thereby a voice guide is outputted.

Figures 9, 10:
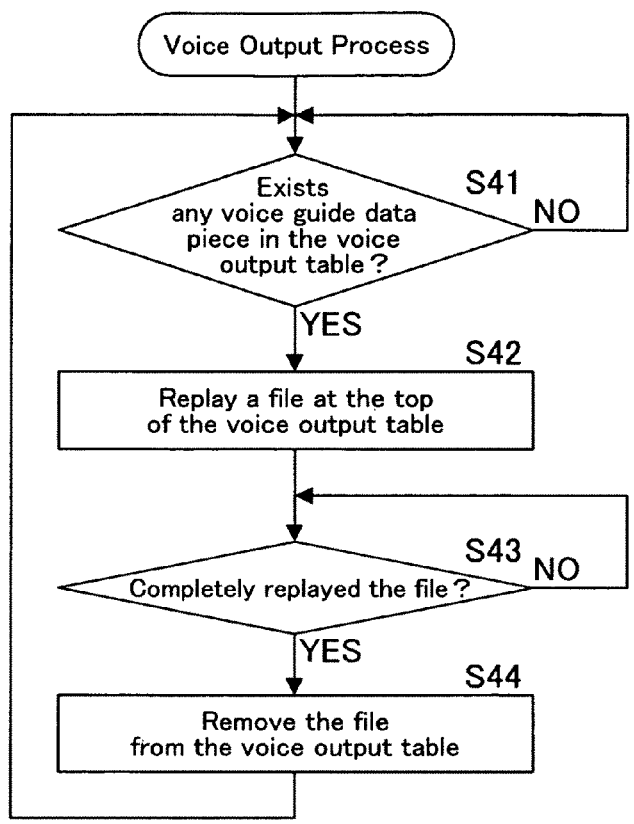
FIG. 9 is a flowchart representing a voice output process.
FIG. 10 is a view showing an example of the voice output table.

FIG. 9 is a flowchart representing a voice output process.

As shown in FIG. 9, it is judged in Step S41 whether or not there exists any voice guide data piece in the voice output table. If there does not exists (NO in Step S41), the routine stays in Step S41. If there exists (YES in Step S41), a file at the top of the voice output table is replayed in Step S42. After that, it is judged in Step S43 whether or not it is completely replayed.

If it is not completely replayed (NO in Step S43), the routine waits until it is completed. If it is completely replayed (YES in Step S43), the replayed file is removed from the voice output table in Step S44. After that, the routine goes back to Step S41 and repeats the procedure explained above.

Here in this embodiment, the copy setting operation is completed and the voice guide data piece that matches the situation "document setting" is added into the voice output table. Concretely, as shown in FIG. 10, the files "orgset1.mp3", "orgset2.mp3" and "orgset3.mp3" that correspond to the Phrase 1 "please open the document cover", Phrase 2 "put a document back-left on the glass surface" and Phrase 3 "and press the start button", respectively, are set in the voice output table in this order. In this case, the voice guide is outputted from the top phrase in this order, and after completion of outputting, these files are deleted.

After the top phrase "please open the document cover" is completely outputted, if the completion of a print job that is other than the current job is detected while Phrase 2 "put a document back-left on the glass surface" is being outputted, the file "printed.mp3" ("the print operation is completed") corresponding to the voice guide data piece that matches the situation "print completion", is added into the voice output table, as shown in FIG. 11. Since the situation "print completion" is prioritized lower than the situation "document setting" as shown in FIG. 2, the file "printed.mp3" is added at the bottom of the voice output table. Thus, a voice guide data piece is prohibited from being outputted according to a job, while a voice guide data piece is being outputted according to another job, which could prevent the inconveniences that if a voice guide happens to need to be outputted according to a job while a voice guide is being outputted according to another job, the currently-outputted voice guide is suddenly stopped and users using the apparatus are confused thereby.

Furthermore, in this embodiment, if a print jam happens to occur while the phrase "put a document back-left on the glass surface" is being outputted, the files "jam.mp3" ("some sheets are stuck") and "remove.mp3" ("please open the cover in the right edge of the apparatus and remove the stuck sheets") corresponding to the situation "print jam" are added into the voice output table.

Here, since the situation "print jam" is prioritized more highly than the situation "document setting" as shown in FIG. 2, the files "jam.mp3" and "remove.mp3" are inserted right after the currently-outputted file "orgset2.mp3".

Accordingly, the voice guide is outputted as "some sheets are stuck" "please remove the cover in the right side of the apparatus and remove the stuck sheets", after the phrase "put a document back-left on the glass surface" is completely outputted.

As described above in this embodiment, if a voice guide data piece to be outputted according to a job is prioritized more highly than a voice guide data piece currently outputted according to another job, the voice guide data piece to be outputted according to a job will be outputted right after a phrase of the currently-outputted voice guide data piece. Therefore, the currently-outputted phrase is not stopped. This could prevent the inconveniences that users using the apparatus are confused by the sudden stop of a phrase currently outputted according to a job. Furthermore, this would enable a voice guide data piece to be outputted according to another job, which is more highly prioritized, to be outputted smoothly.

Figure 14:
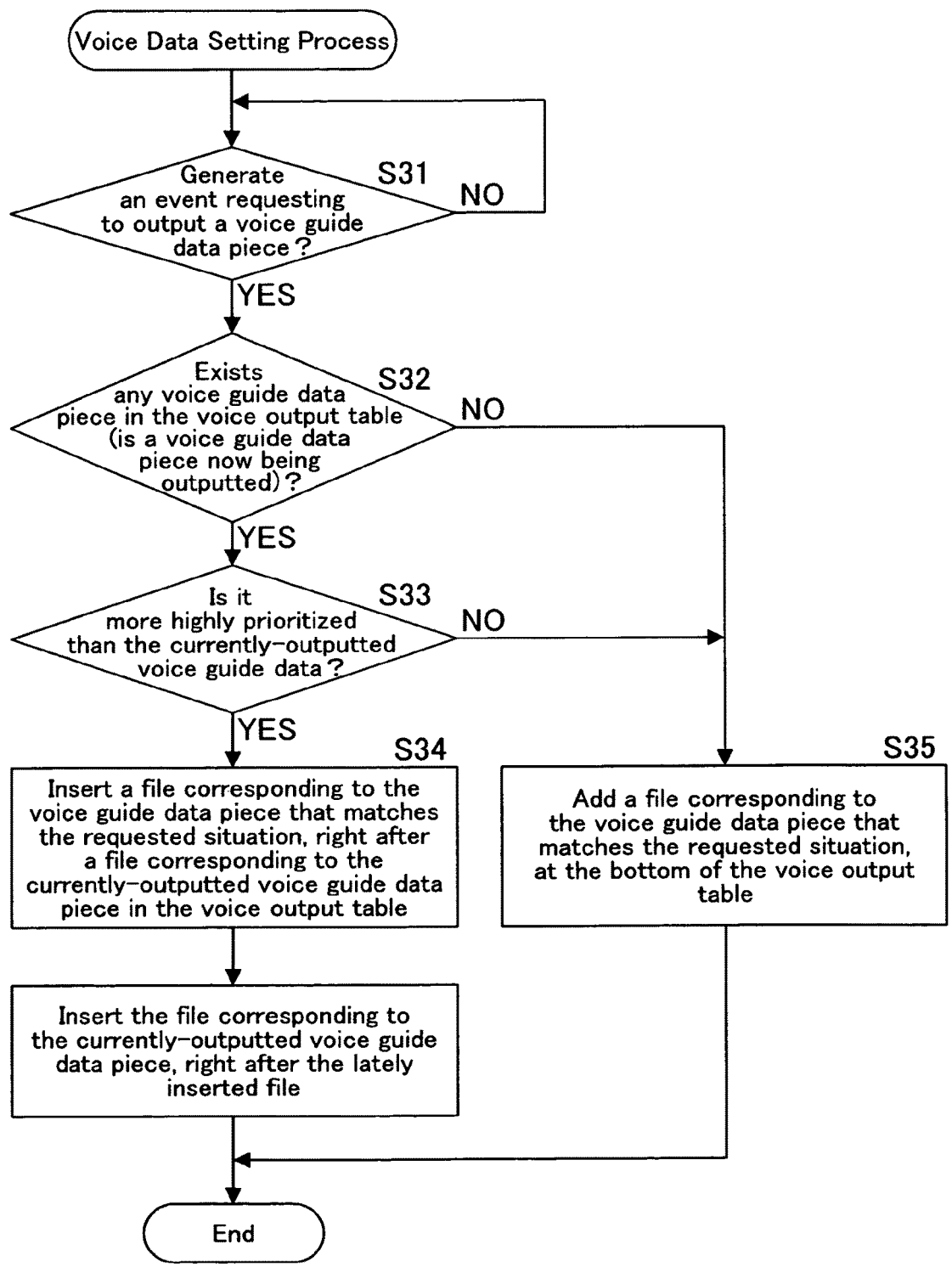
FIG. 14 is a flowchart representing a procedure executed in the above-mentioned embodiment of the present invention.

FIG. 13 and FIG. 14 show another embodiment of the present invention. In this embodiment, a phrase stopped to be outputted according to a job, is outputted again right after a voice guide data piece is completely outputted according to another job.

For example, if a print jam happens to occur while the phrase "put a document back-left on the glass surface" is being outputted, as shown in FIG. 12, the files matching the situation "print jam", which are "jam.mp3" ("some sheets are stuck") and "remove.mp3" ("please open the cover in the right edge of the apparatus and remove the stuck sheets"), are inserted right after the currently-outputted file "orgset2.mp3" in the voice output table. Accordingly, the voice guide is outputted as "some sheets are stuck" "please open the cover in the right edge of the apparatus and remove the stuck sheets" right after the phrase "put a document back-left on the glass surface". Subsequently, after the voice guide data piece that matches the situation "print jam" is completely outputted, the phrase "put a document back-left on the glass surface" is outputted again. Thus, as shown in the voice output table of FIG. 13, the currently-outputted file "orgset2.mp3" is inserted right after the files matching the situation "print jam", which are "jam.mp3" and "remove.mp3".

An administrator user or etc. can set in advance whether or not to control the voice guide operations as described above.

FIG. 14 is a flowchart representing a voice data setting process executed in order to output again a phrase that is stopped to be outputted according to a job, after completion of outputting a voice guide data piece about another job.

This procedure is exactly the same as that shown in FIG. 8 with the exception of Step S36 inserted right after Step S34. Therefore, the same Step numbers are given to the same Steps and explanation thereof will not be repeated.

In Step S36, a file corresponding to the currently-outputted (currently-replayed) voice guide data piece detected in Step S32 is inserted right after a voice guide data piece inserted in Step S34, which is more highly prioritized. Accordingly, the currently-outputted voice guide data piece will be outputted again right after the voice guide data piece inserted in Step S34.

Each described above relates to one embodiment of the present invention. However, the present invention is not limited to these embodiments. For example, in these embodiments, different priority levels are given to respective voice guide data pieces depending on their matched situations. Instead of giving priority levels thereto, a voice guide data piece to be outputted in its matched situation according to a job may be regularly added at the bottom of the voice output table.

Furthermore, in these embodiments, voice guide data pieces to be outputted in their matched situations, are assigned to a plurality of phrases. Alternatively, voice guide data pieces may not be assigned to a plurality of phrases and may be used collectively as one data piece.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a data memory that stores in itself voice guide data pieces that are assigned to a plurality of phrases;
a voice output portion that outputs the voice guide data pieces stored in the data memory; and
a controller that prohibits a first voice guide data piece from being outputted according to a job by the voice output portion, while a currently-outputted voice guide data piece is being outputted according to another job thereby, and the controller prohibits the first voice guide data piece from being outputted according to a job, while a phrase of the currently-outputted voice guide data piece is being outputted according to another job, at least until the phrase is completely outputted,
wherein different priority levels are given to the respective voice guide data pieces depending on their matched situations, and the controller prohibits the first voice guide data piece from being outputted according to a job, while a phrase of the currently-outputted voice guide data piece is being outputted according to another job, at least until the phrase is completely outputted.

2. The image processing apparatus recited in claim 1, wherein:
the controller lets the phrase to be outputted again after the first voice guide data piece is completely outputted.

3. A voice guide method of an image processing apparatus, comprising:
outputting voice guide data pieces stored in a data memory according to jobs, wherein the voice guide data pieces are assigned to a plurality of phrases, and different priority levels are given to the respective voice guide data pieces depending on their matched situations;
prohibiting a first voice guide data piece from being outputted according to a job, while outputting a currently-outputted voice guide data piece according to another job;
prohibiting the first voice guide data piece from being outputted according to a job, while outputting a phrase of the currently-outputted voice guide data piece according to another job, at least until completion of outputting the phrase;
prohibiting the first voice guide data piece from being outputted according to a job, while outputting a phrase of the currently-outputted voice guide data piece according to another job, at least until completion of outputting the phrase; and
outputting the first voice guide data piece according to a job, after completion of outputting the phrase, if the first voice guide data piece is prioritized more highly than the currently-outputted voice guide data piece.

4. The voice guide method recited in claim 3, further comprising:
outputting the phrase again after completion of outputting the first voice guide data piece.

5. A non-transitory computer readable recording medium having a voice guide program recorded therein to make a computer execute:
outputting voice guide data pieces stored in a data memory according to jobs, wherein the voice guide data pieces are assigned to a plurality of phrases, different priority levels are given to the respective voice guide data pieces depending on their matched situations; and
prohibiting a first voice guide data piece from being outputted according to a job, while outputting a currently-outputted voice guide data piece according to another job;
prohibiting the first voice guide data piece from being outputted according to a job, while outputting a phrase of the currently-outputted voice guide data piece according to another job, at least until completion of outputting the phrase, in the prohibiting step; and
outputting the first voice guide data piece according to the job, after completion of outputting the phrase, if the first voice guide data piece is prioritized more highly than the currently-outputted voice guide data piece.

6. The non-transitory computer readable recording medium recited in claim 5, which voice guide program recorded therein further makes the computer execute:
outputting the phrase again after completion of outputting the first voice guide data piece.

* * * * *